United States Patent [19]

Wood

[11] Patent Number: 4,869,424
[45] Date of Patent: Sep. 26, 1989

[54] ARTICLE CONTAINER WITH COVER

[75] Inventor: Prentice J. Wood, Hapeville, Ga.

[73] Assignee: The Mead Corporation, Dayton, Ohio

[21] Appl. No.: 257,549

[22] Filed: Oct. 14, 1988

[51] Int. Cl.⁴ .............................................. B65D 43/08
[52] U.S. Cl. ................................. 229/113; 229/23 BT; 229/125.19; 229/186
[58] Field of Search ................. 229/40, 23 R, 23 BT, 229/125.19, 186, 113, 52 B; 206/427, 434

[56] References Cited

U.S. PATENT DOCUMENTS

| | | | |
|---|---|---|---|
| 3,176,900 | 4/1965 | Ciganenko | 229/125.19 |
| 3,428,234 | 2/1969 | DuBarry, Jr. | 229/23 R |
| 3,815,808 | 6/1974 | Bunnell | 229/52 B |
| 3,910,483 | 10/1975 | Ritter | 229/125.19 |
| 4,022,372 | 5/1977 | Graser | 229/40 |
| 4,482,090 | 11/1984 | Milliens | 206/427 |
| 4,802,583 | 2/1989 | Calvert et al. | 229/40 |

Primary Examiner—Gary Elkins
Attorney, Agent, or Firm—Rodgers & Rodgers

[57] ABSTRACT

A reusable open top case having rectangular interconnected bottom, side and end panels is provided with a disposable cover which includes a top wall overlying the open top of the case and which also includes side and end walls foldably joined to the top wall of the cover together with web structure interconnecting the corners of the side and end walls.

16 Claims, 2 Drawing Sheets

ARTICLE CONTAINER WITH COVER

TECHNICAL FIELD

This invention relates to the packaging and distribution of consumer items such for example as bottles of beer, soft drinks and the like.

BACKGROUND ART

U.S. Pat. No. 3,815,808 for "Packaging Structure" which issued June 11, 1974 discloses and claims a bottle carrying tray which is reusable and a disposable cardboard sleeve which telescopes downwardly over the open top of the tray. This tray and sleeve arrangement does not lend itself to machine handling and requires substantial labor expense.

U.S. Pat. No. 3,854,652 for "Blank for Container Cover" issued Dec. 17, 1974 discloses a blank from which a sleeve may be formed and which preferably utilizes two layers of cardboard, the sleeve being disposable.

U.S. patent application Ser. No. 167,094 filed Mar. 11, 1988 and owned by the assignee of this invention discloses a reusable case in conjunction with a disposable overwrap for covering the top, bottom, sides and ends of the case.

SUMMARY

According to this invention in one form a reusable case formed preferably of corrugated boxboard or molded plastic includes a rectangular bottom wall, a pair of side panels joined to the side edges of the bottom wall and projecting upwardly therefrom together with a pair of end panels joined to opposite end edges of the bottom wall and to the end edges of the side panels to form an open top structure together with a disposable cover having a rectangular top wall overlying the case together with a pair of downwardly extending side walls foldably joined to side edges of the top wall, a pair of downwardly extending end walls foldably joined respectively to the end edges of the top wall, a triangular panel at each corner of the top wall having a pair of downwardly divergent side edges which extend from each corner of the top wall, one of the side edges being foldably joined to the adjacent end edge of the associated end wall, collapsible web structure at each corner of the top wall and foldably joined along one edge thereof to the other downwardly divergent side edge of the associated triangular panel and which is foldably joined along another edge to the adjacent edge of the associated side wall, and adhesive arranged to secure the collapsible web structure in collapsed condition to the inner surface of the adjacent end of each of the side walls.

The height of the side and end walls of the reusable case is greater than the height of the corresponding elements of the cover and the corner structure of the cover is specially configured securely and tightly to grip the lower portion of the case and the top wall of the cover is slightly larger than the outer dimensions of the case. Corner web structures also serve as reinforcement for the cover side walls to inhibit outward buckling and a fold line in the end walls of the cover aids in preventing outward buckling of the end walls.

BEST MODE OF CARRYING OUT THE INVENTION

Figure 1:
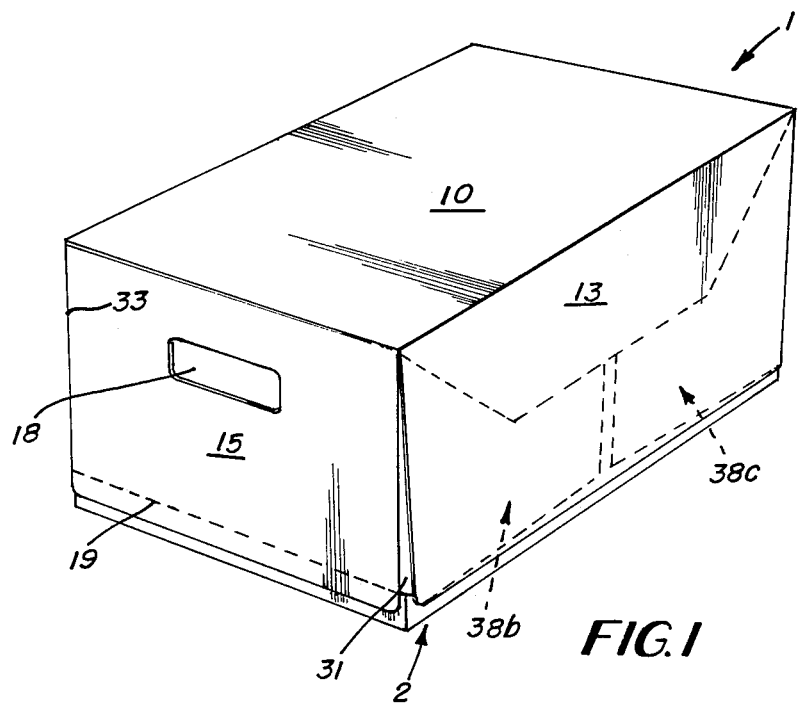
FIG. 1 is a perspective view of a completed article container including a case and associated cover formed according to this invention.
Figure 2:
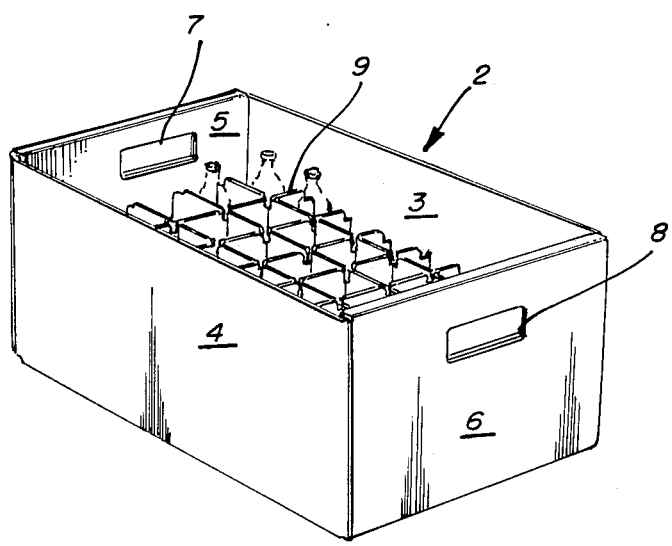
FIG. 2 is a perspective view of a case which is reusable and which forms a component of the structure shown in FIG. 1

With reference to FIGS. 1 and 2 the cover 1 formed according to this invention is shown in FIG. 1 in overlying telescoping relation to the case generally designated by the numeral 2. The case 2 includes side walls 3 and 4 and end walls 5 and 6. Hand gripping aperture 7 is formed in end wall 5 while hand gripping aperture 8 is formed in end wall 6. Partition structure 9 is disposed within the case 2. The case 2 as shown in FIG. 2 is of conventional construction and preferably although not necessarily is formed of molded plastic material. Of course the case 2 includes a bottom which is not observable in the drawings.

Figure 3:
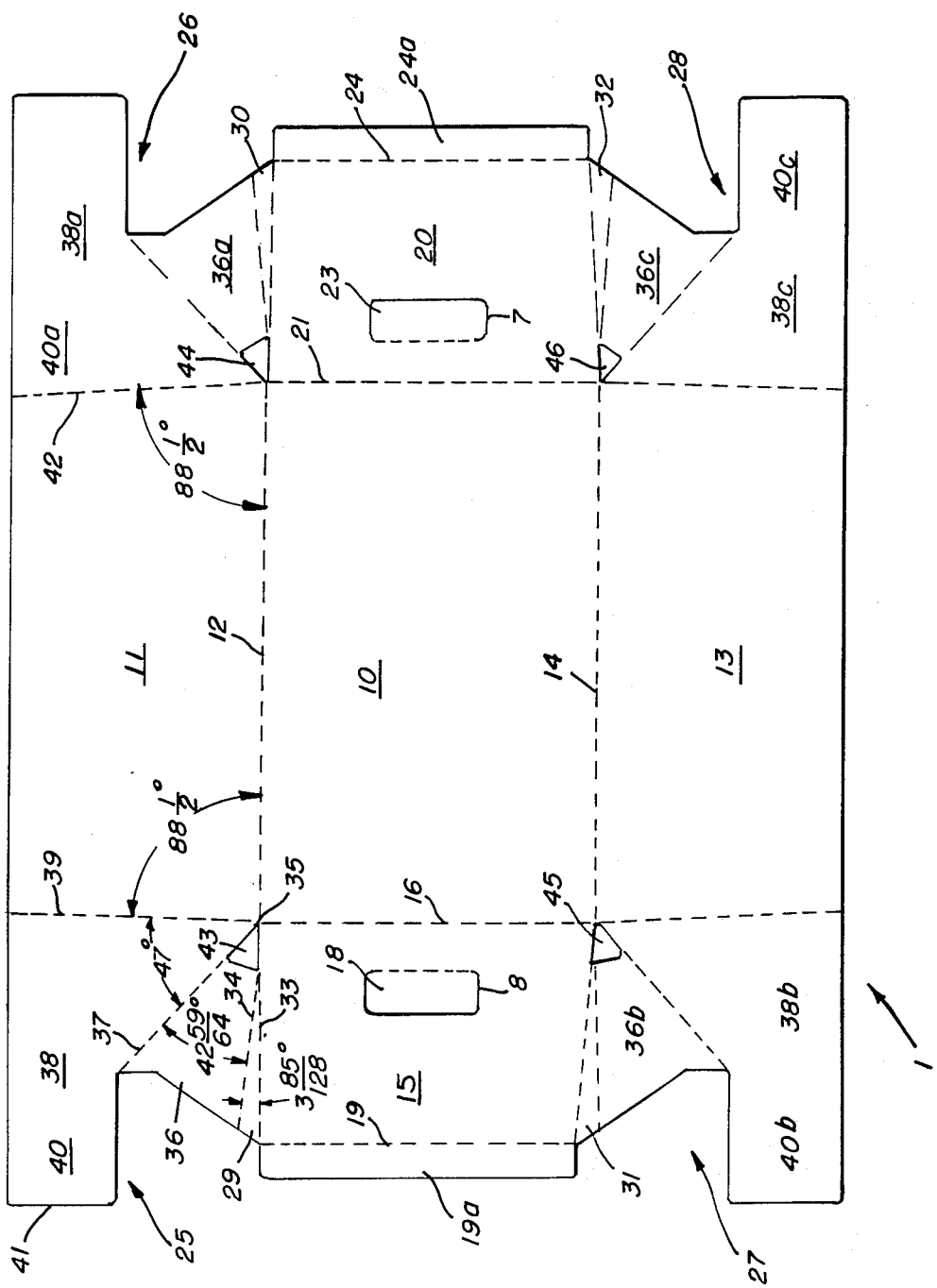
FIG. 3 is a plan view of a cover blank formed according to this invention and which is shown in FIG. 1 in telescoping relation relative to the associated case.

As best shown in FIG. 3 the cover 1 includes a top wall 10 to which a side wall 11 is foldably joined along fold line 12. Side wall 13 is foldably joined to top wall 10 along fold line 14. End wall 15 is foldably joined to top wall 10 along a fold line 16 and includes hand gripping aperture 8 which is normally closed in conventional fashion by a flap 18. A fold line 19 is formed in end wall panel 15. At the other end of the blank, an end wall 20 is foldably joined to top wall 10 along a fold line 21. Hand gripping aperture 7 is normally closed by a flap 23 which is of conventional construction. A fold line 24 is formed in end wall 20 near the bottom edge thereof.

Web structure is formed at each corner of the blank and is generally identified in FIG. 3 by the numerals 25, 26, 27 and 28. These web structures and their associated triangular panels 29, 30, 31 and 32 are of identical configuration and dimensions. Web structure 25 and triangular panel 29 are here described in detail.

With reference to web structure 25 and triangular panel 29, the triangular panel 29 is defined by a pair of fold lines 33 and 34 which intersect at the corner 35 of top wall 10. The angle between fold lines 33 and 34 is 3 and 85/128 degrees. Web structure 25 includes a web 36 defined by fold line 34 and by fold line 37. The angle between fold line 34 and fold line 37 is 42 and 59/64 degrees. Web structure 25 includes web 38 which is defined by fold line 37 and by the end edge 39 of side wall 11. Fold lines 37 and 39 diverge by an angle of 47 degrees. Web 38 includes a projecting part 40 the length of which between fold line 39 and the end edge 41 is approximately equal to one-half the length of side wall 11.

From FIG. 3 it is apparent that the fold line 39 which defines the end edge of side wall 11 is disposed at an angle of 88 and ½ degrees to the fold line 12 by which side wall 11 is foldably joined to top wall 10. Thus the fold line 39 and the fold line 42 at the opposite end of side wall 11 converge toward each other in view of the angular relationship between these fold lines and the fold line 12.

A cutaway triangular area is formed at each corner of top wall 10 and is identified by the numerals 43, 44, 45 and 46. These cutaway areas simply avoid undue crowding or jamming of adjacent elements when the blank of FIG. 3 is set up in completed form as shown in FIG. 1.

In order to form the article container as shown in FIG. 1 from the case 2 and the blank 1 of FIG. 3, the case 2 is loaded with items to be packaged and passed underneath the blank 1 which is manipulated by machine elements in such manner as to fold the side walls 11 and 13 downwardly simultaneously with downward folding of end walls 15 and 20 into enveloping relation to case 2. This operation collapses the web structures 25-28 and causes the triangular panels 29 30, 31 and 32 to assume positions astride each of the corners of the case 2, the triangle 31 being shown in FIG. 1 in a position astride the adjacent corner of the case 2.

Of course an appropriate application of glue is made to the web structures so as to hold these structures in collapsed condition and with the panels 38, 38a, 38b and 38c in flat face contacting relation with the inner surfaces of the side walls 11 and 13 as is apparent from FIG. 1. These webs and their extending elements 40, 40a, 40b and 40c reinforce substantially the entire side walls 11 and 13 of the cover and tend to prevent outward bowing of the side walls and add substantially to the strength and integrity of the cover.

According to one feature of the invention, the top wall 10 of the cover 1 is slightly larger by approximately one-eighth of an inch in width and in length than the exterior dimensions of the associated case 2. For this reason and because of the tight gripping of the side and end walls due to the collapsed web structure and the orientation of the triangular panels 29, 30, 31 and 32, the end walls such as 15 and 20 are snugly urged against the end walls of the case 2 thus effecting a slight outward folding of the strips 19a and 24a at each end of the container. Thus the fold line is afforded a measure of rigidity and is urged tightly into engagement with the end walls of the container 2. This cooperation of parts aids substantially in preventing outward bowing of the end walls 15 and 20 in accordance with one feature of the invention.

From the above description, it is apparent that by this invention an improved article container is provided which lends itself to machine handling and which provides a disposable cover for use preferably with a reusable plastic case and which provides ample opportunity for desirable graphic displays and affords dust and light protection for the packaged bottles. The adaptability of the invention for machine handling and because the paperboard cover blank is formed from light weight paperboard result in substantial economies which are effected by the invention.

I claim:

1. An article container comprising a reusable case having a rectangular bottom wall, a pair of side panels joined respectively to opposite side edges of said bottom wall and projecting upwardly therefrom, and a pair of end panels joined respectively to opposite end edges of said bottom wall and respectively joined at their end edges to adjacent end edges of said side panels to form a rigid open top structure and a disposable cover having a rectangular top wall overlying said case and being slightly longer and wider respectively than the corresponding exterior dimensions of said open top structure, a pair of downwardly extending side walls foldably joined respectively along the entire length of said side edges of said top wall, a pair of downwardly extending end walls foldably joined respectively along the entire length of said end edges of said top wall, the end edges of each of said side and of said end walls being inwardly tapered to define walls of trapezoidal configuration, a triangular panel at each corner of said top wall having its apex in coincidence with the associated corner of said top wall and having a pair of downwardly divergent side edges one of which is foldably joined to the adjacent inwardly tapered edge of the associated end wall, and collapsible web structure at each corner of the cover and foldably joined along one edge thereof to the other of said downwardly divergent side edges of the associated triangular panel and foldably joined along another edge thereof to the adjacent inwardly tapered edge of the associated side wall, and adhesive means securing each of said collapsible web structures in collapsed condition to the inner surface of the adjacent end of each of said side walls.

2. An article container according to claim 1 wherein a transverse fold line is formed in each of said end walls near the lower edge thereof to define a strip which is outwardly folded along said transverse fold line and through a small angle thereby to bias said transverse fold line into tight gripping relation with each of said end walls.

3. An article container according to claim 1 wherein the height of said side and of said end panels is slightly greater than the height of said side and of said end walls.

4. An article container according to claim 1 wherein each end edge of each of said side walls is inwardly tapered to define an angle of approximately 88.5 degrees between each such end edge and the fold line between said top wall and the associated side wall.

5. An article container according to claim 1 wherein each of said web structures comprises a pair of webs one of which is defined in part by the end edge of the adjacent side wall and by a fold line one end of which coincides with the adjacent corner of said top wall and wherein a projection of said one web extends from said end edge of said adjacent side wall for a distance equal to approximately one-half the length of said side wall.

6. An article container according to claim 5 wherein the angle between said end edge of the adjacent side wall and said fold line is approximately 47 degrees.

7. An article container according to claim 1 wherein each of said web structures comprises a pair of webs one of which is defined by a fold line one end of which coincides with the adjacent corner of said top wall and along which each of said web structures is collapsed and by said other of said downwardly divergent side edges of the associated triangular panel.

8. An article container according to claim 7 wherein the angle between said fold line and said other of said downwardly divergent side edges is approximately 42 and 59/64 degrees.

9. An article container according to claim 1 wherein the angle between said downwardly divergent side edges of said triangular panel is approximately 3 and 85/128 degrees.

10. An article container according to claim 1 wherein each of said triangular panels is disposed astride the adjacent corner of said case.

11. A paperboard blank for a disposable cover comprising a rectangular top wall, a pair of side walls foldably joined respectively to said top wall along the entire length of the side edges thereof, a pair of end walls foldably joined respectively to said top wall along the entire length of the end edges thereof, the end edges of each of said side and of said end walls being inwardly tapered to define walls of trapezoidal configuration, a triangular panel at each corner of said top wall having its apex in coincidence with the associated corner of said top wall and having a pair of divergent side edges one of which is foldably joined to the adjacent inwardly tapered edge of the associated end wall, and collapsible web structure at each corner of the cover and foldably joined along one edge thereof to the other of said side edges of the associated triangular panel and foldably joined along another edge thereof to the adjacent inwardly tapered edge of the associated side wall.

12. A paperboard blank according to claim 11 wherein a transverse fold line is formed in each of said end walls near the outer edge thereof.

13. A paperboard blank according to claim 11 wherein each end edge of each of said side walls is inwardly tapered to define an angle of approximately 88.5 degrees between each such end edge and the fold line between said top wall and the associated side wall and wherein each of said web structures comprises a pair of webs one of which is defined in part by the end edge of the adjacent side wall and by a fold line one end of which coincides with the adjacent corner of said top wall and which is disposed at an angle of approximately 47 degrees to the end edge of the adjacent side wall.

14. A paperboard blank according to claim 11 wherein a triangular panel at each corner of said top wall includes a pair of side edges which diverge at an angle of approximately 3 and 85/128 degrees and with the apex thereof in coincidence with the adjacent corner of said top wall and wherein one of each of said side edges is foldably joined to the adjacent end wall and the other of which is foldably joined to said one edge of said collapsible web structure.

15. A paperboard blank according to claim 13 wherein the other of said webs is defined by said fold line and by the other side edge of the associated triangular panel, said fold line and said other side edge of said associated triangular panel being disposed at an angle of approximately 42 and 59/64 degrees to each other.

16. A paperboard blank according to claim 15 wherein a cutaway area of triangular configuration is cut from said other of said web panels and arranged with its apex in coincidence with the adjacent corner of said top wall.

* * * * *